United States Patent [19]

Tanimoto

[11] 4,023,080
[45] May 10, 1977

[54] PHASE SYNCHRONIZING CIRCUIT

[75] Inventor: Kenji Tanimoto, Ebina, Japan

[73] Assignee: Fuji Xerox Co., Ltd., Tokyo, Japan

[22] Filed: Apr. 7, 1975

[21] Appl. No.: 565,731

[52] U.S. Cl. ............................ 318/85; 318/612; 318/675
[51] Int. Cl.² .......................................... G05B 1/06
[58] Field of Search ................ 318/612, 85, 675

[56] References Cited

UNITED STATES PATENTS

| 3,668,494 | 6/1972 | Agin | 318/612 X |
| 3,906,328 | 9/1975 | Wenrich et al. | 318/612 |

*Primary Examiner*—B. Dobeck
*Attorney, Agent, or Firm*—Gerald J. Ferguson, Jr.; Joseph J. Baker

[57] ABSTRACT

A circuit for synchronizing a motor at the receiving end of a communication link with one at the transmitting end thereof, the circuit preventing an indication of synchronization until the receiving end motor reaches its rated speed.

2 Claims, 3 Drawing Figures

PHASE SYNCHRONIZING CIRCUIT

BACKGROUND OF THE INVENTION

1. Field of the Invention

The present device relates to a phase synchronizing circuit used for phase synchronization between a facsimile receiver and a facsimile transmitter.

2. Description of the Prior Art

In the case of facsimile transmission, transmission of a clear and distinct image is difficult unless the phase of the image on the transmitter side and the phase of the image on the receiver side are properly synchronized in a precise manner at the time of reception. Such being the situation, various sorts of synchronizing circuits, including ones of the follow-up type, such as disclosed in U.S. Pat. No. 3,408,547, are employed. In case phase deviation is present between the transmitter side and the receiver side, the latter type of synchronizer reduces the speed of the drum driving motor on the receiver side to thus ensure proper matching between both phases, and, after proper matching between both phases, the frequency of the input signal to the drum driving motor on the receiver side is maintained at a normal frequency to thus start the transmisssion of an image all of the foregoing have been thus far employed in conventional practice. However, a phase synchronizing circuit of the follow-up type as set forth above is subject to a certain limit in terms of precision, and thus another improved synchronizer of the follow up type has been introduced, this being disclosed in U.S. patent application Ser. No. 429,907 filed July 26, 1974 being the inventor of the present invention. The latter synchronizer, in addition to reducing the speed of the drum driving motor on the receiver side until the time of matching between the receiver and a transmitter, applies a direct-current voltage to the drum driving motor for a certain period of time each time a phase signal time is generated when the receiving drum makes a full revolution. The direct-current voltage thus controls the said motor by proper braking, and both the transmitter and receiver phases are synchronized in a precise manner. However, such a phase synchronizing circuit as just set forth above, is still not free from defects in that, if the drum on the transmitter side and the drum on the receiver side have a large speed difference from each other, such as immediately after the receiving drum has just started the revolution thereof, both phases may be temporarily synchronized in some cases whereby a phase synchronization completion signal would be thus generated at the receiver side. Hence, the subsequent input to the receiving drum driving motor would be maintained at the above-mentioned normal frequency to thus render phase synchronization impracticable. Furthermost a long period of time would be required for effectuating proper phase synchronization, due to the correction by braking each time being only slight.

SUMMARY OF THE INVENTION

The present device eliminates such defects inherent in conventional phase synchronizing circuits as set forth above and enables phase synchronization to be effectuated in a short period of time by preventing a phase synchronization completion signal from being generated in case apparent phase synchronization should occur during the initial or starting revolutions of the receiving drum.

BRIEF DESCRIPTION OF THE DRAWINGS

Shown in the drawings attached hereto is an illustration of the present device.

DESCRIPTION OF THE PREFERRED EMBODIMENT $U_1$ is a phase synchronizing circuit of the follow-up type, such as described in aforemention Patent 3,408,547 $U_2$ is a braking correction circuit, such as described in aforementioned patent application Ser. No. 492,907. $U_4$ is a time delay circuit.

Figure 1:
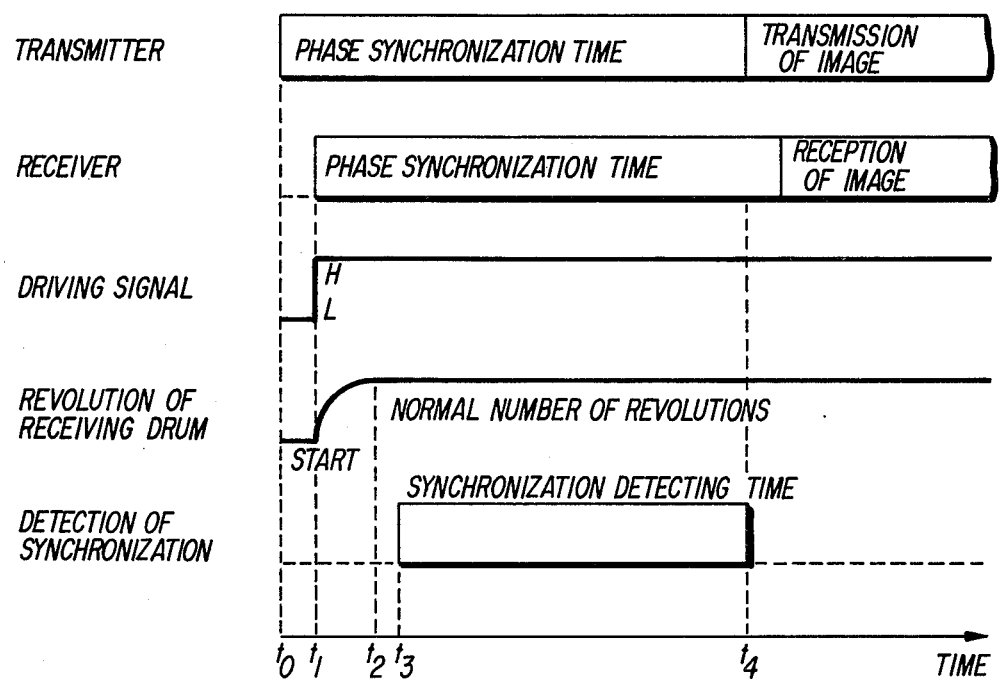
FIG. 1 being an explanatory drawing of the action of the phase synchronizing circuit.

A detailed description of the present device will be given below by making reference to an illustration shown in the drawings attached hereto. The basic action of the phase synchronizing circuit is as shown in FIG. 1, wherein a transmitter is so designed as to transmit image information after transmitting a phase synchronizing signal from the time of starting the transmission $t_0$, and a receiver, starts the receiving action thereof from the time $t_1$ after receiving the transmission signal. To put it otherwise, the receiving drum revolves, starting from the time $t_1$, and reaches the stage of normal revolution or speed after the time $t_2$. The phase synchronizing operation of the receiver starts from the time $t_1$, and extends throughout the period ending at the time $t_4$, corresponding to the closure of the phase synchronizing time, and the phase synchronizing circuit attempts to detect the state of phase synchronization, starting from the time $t_3$, after the receiving drum driving motor has reached normal speed.

Figure 2:
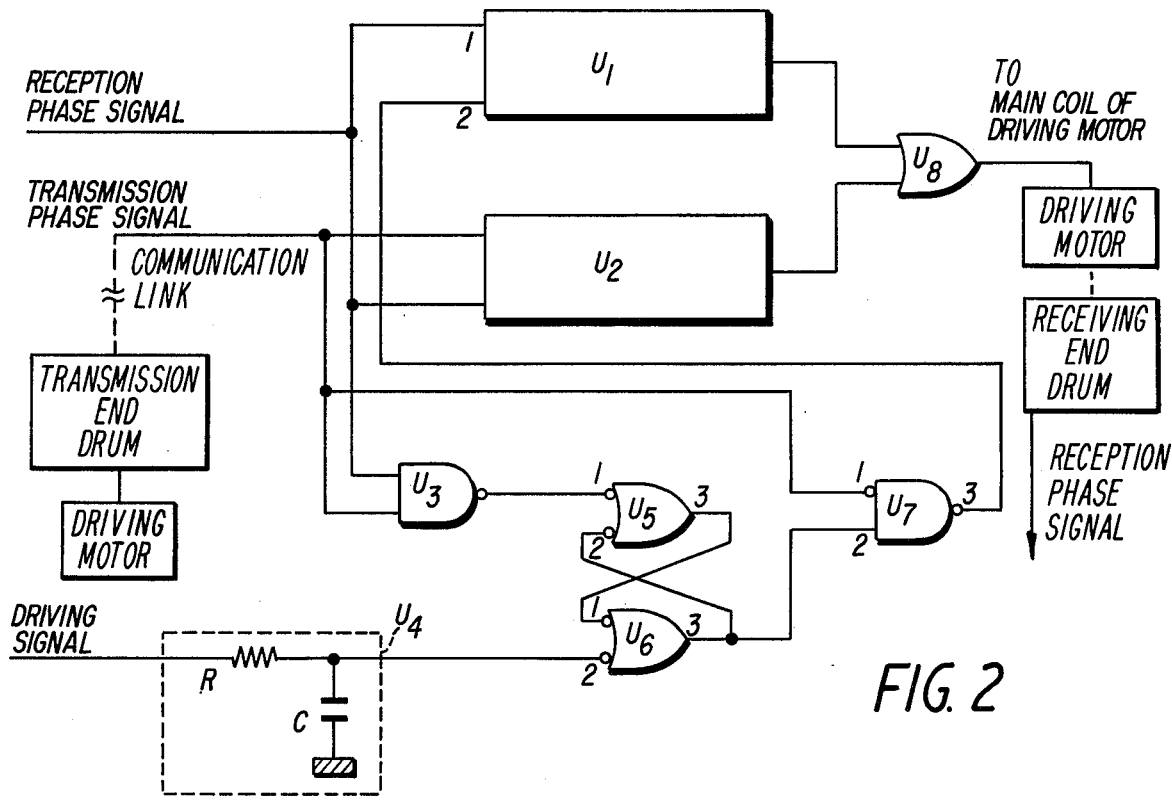
FIG. 2 being a circuit diagram thereof.
Figure 3:
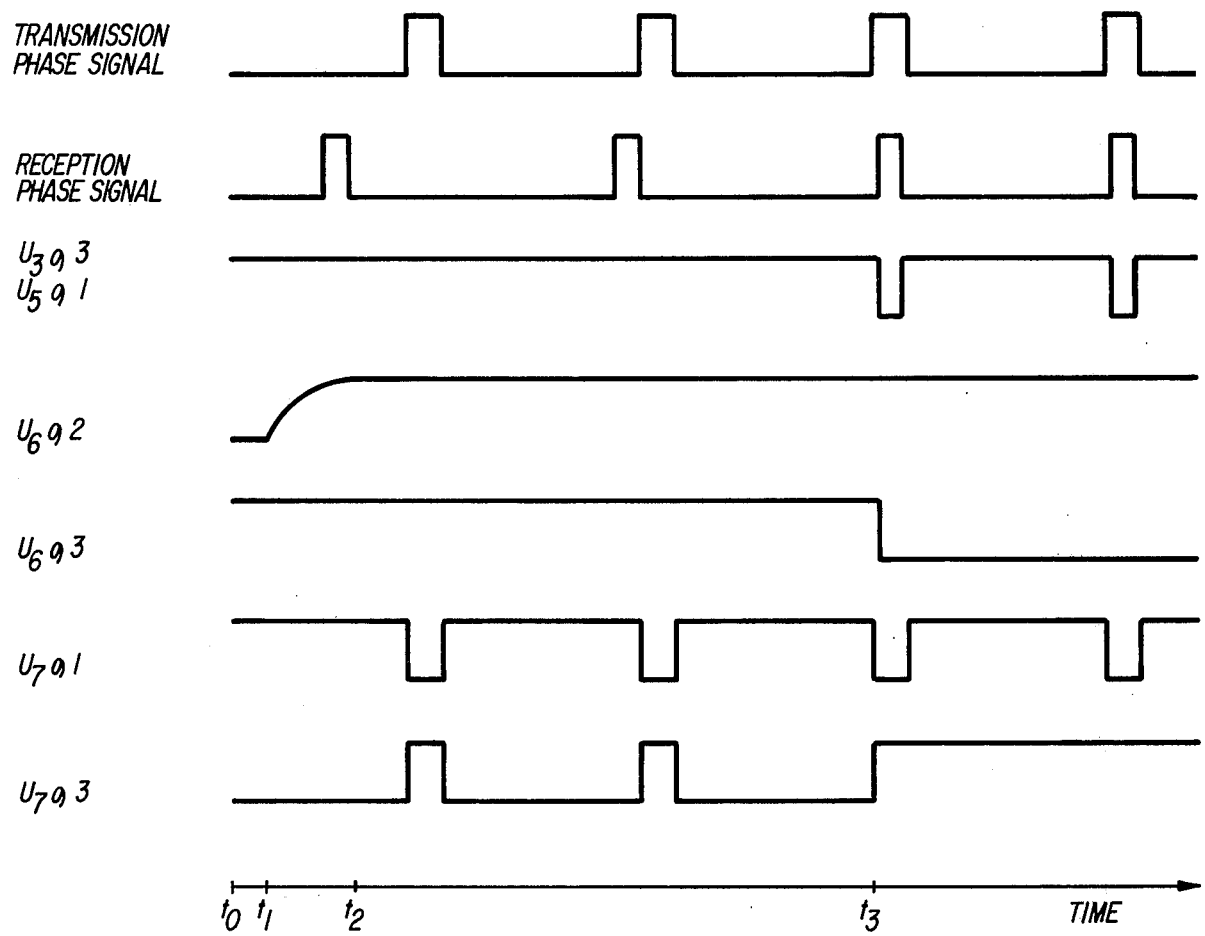
FIG. 3 being a waveform diagram.

Next, by making reference to FIG. 2 and FIG. 3, a phase transmitted by the transmitter, not shown in the drawings, is fed to correction circuit $U_2$ of the braking type. The correction circuit $U_2$ of the braking type applies direct-current voltage on the main coil of the drum driving motor on the receiver side for a specified period of time, thus effectuating proper braking of the said drum driving motor, each time the leading edge of the phase signal on the transmission side and the leading edge of the phase signal on the reception side are different from each other in time.

The said transmission phase signal and the said reception phase signal generated by the receiver, not shown in the drawings, are applied to an and-gate $U_3$. The output signal of and-gate $U_3$ is in the state of "L" only when a pulse of the transmission phase signal is being generated concurrently, with a pulse of the reception phase signal. Otherwise, it is meanwhile in the state of "H" on the other cases, and the output of and-gate $U_3$ is fed to a gate $U_5$ as an input therefor. Furthermore, a driving signal which changes from the state of "L" to the state of "H" at the time $t_1$ is delayed by as much as $t_2 - t_1$ by a time delay circuit $U_4$ comprising a resistor R and a capacitor C, and is thus fed to a gate $U_6$ as an input therefore. The said gate $U_6$, and gate $U_5$, comprises a latch circuit, and an output terminal 3 of $U_6$ is fixed in the state of "H" immediately after the receiving drum starts the revolution thereof. To put it otherwise, an input terminal 2 of gate $U_6$ is in the state of "L", irrespective of the output signal of the and-gate $U_3$. Thus, the input terminal 2 of a gate $U_7$ remains in the state of "H", even if the phase on the transmitter side and the phase on the receiver side are temporarily in proper synchronization with each other and the output terminal 3 of the gate $U_7$ generates as an ouput the same signal as the transmission phase signal in this state.

The sychronizing circuit $U_1$ of the follow-up type, generates a frequency of 94.5 Hz, instead of the normal frequency of 126 Hz, in the period of time starting from the time the input terminal 1 is changed from the state of "L" to the state of "H" through the time the input terminal 2 is changed from the state of "L". The input terminal 1 of this synchronizing circuit $U_1$ has the reception phase signal applied thereon, and the other input terminal 2 has a transmission phase signal as is transmitted from the gate $U_7$ applied thereon; furthermore, the output signal is applied to the main coil of the receiving drum driving motor through the gate $U_8$.

After the receiving drum starts the revolution thereof and reaches its normal speed (after the time $t_2$), the input terminal 2 of the gate $U_6$ is maintained in the state of "H" due to the driving signal delayed by $U_4$. Once the transmission phase signal and the reception phase signal are synchronized with each other in such a state as this, the output terminal of the and-gate $U_3$ switches to the state of "L", whereby the output terminal 3 of the gate $U_5$ switches to the state of "H", and the output terminal 3 of the gate $U_6$ switches to state of "L", respectively. Therefore, the output terminal 3 of the gate $U_7$ is now maintained in the state of "H", irrespective of the nature of the signal received by the input terminal 1. The input terminal 2 of the synchronizing circuit $U_1$ of the follow-up type is thus fixed in the state of "H", and the main coil of the receiving drum driving motor always has applied thereto the normal frequency of 126 Hz. Thereby the receiving drum driving motor is driven at normal speed by the normal frequency signal thereafter.

The present device is so designed, as set forth in detail in the preceding paragraphs, that the latch circuit $U_5$ and $U_6$ is prevented by $U_4$ from being operated by $U_3$ for a specified period of time immediately after transmission has started, and, after a lapse of a specified period of time, established by $U_4$ the latch circuit is put in operation. Thus, an erroneous operation through apparent phase matching by $U_3$ is prevented, only when phase synchronization is effectuated in the synchronization detection period can proper synchronization of the transmission side with the reception side be ensured thus, with the braking correction circuit also put in operation, synchronization occurs in a stabilized manner with superb precision and in a short period of time.

While the invention has been described in detail and with reference to specific embodiments thereof, it will be apparent to one skilled in the art that various changes and modifications can be made therein without departing from the spirit and scope thereof.

What is claimed is:
1. A circuit which synchronizes a motor at the receiving end of a communication link with one at the transmitting end thereof, said motors respectively driving drums at the receiving and transmitting ends of said link, said receiving end including means responsive to the receiving end drum for generating a reception phase signal each rotation of the receiving end drum and said transmitting end including means responsive to the transmitting end drum for generating a transmission phase signal each rotation of the transmitting end drum, said circuit comprising a phase synchronizing circuit for repeatedly applying to the main coils of the receiving end motor reduced frequency signals having a lower frequency than the rated frequency thereof to thereby reduce the phase deviation between the receiving and transmitting end motors, said phase synchronizing circuit generating each reduced frequency signal upon each occurence of said reception phase signal and terminating each reduced frequency signal upon each occurrence of said transmission phase signal, said reduced frequency signals being applied to said main coils until said reception and transmission phase signals are brought into phase; and means for maintaining the application of said reduced frequency signals to said main coils of the receiving end motor during the starting time of the receiving end motor even though the reception and transmission phase signals may temporarily be in phase during the starting time.

2. A circuit as in claim 1 where
said phase synchronizing circuit includes
sensing means for sensing when said transmission and reception phase signals are in phase synchronism and
latch means responsive to said sensing means for continuously applying said rated frequency signals to said main coils of the receiving end motor when said phase synchronization is sensed and
said means for maintaining the reduced frequency signals to said main coils of the receiving end motor includes means preventing said latch means from being responsive to said sensing means until a predetermined period of time after the initial reception of the transmission phase signal at the receiving end of said communication link, said predetermined period of time being sufficient to ensure said application of said reduced frequency signals to said main coils of the receiving end motor during the starting time thereof.

* * * * *